Dec. 7, 1954     O. J. UNDERWOOD     2,696,120
TEMPERATURE INDICATING APPARATUS
Filed Jan. 2, 1951
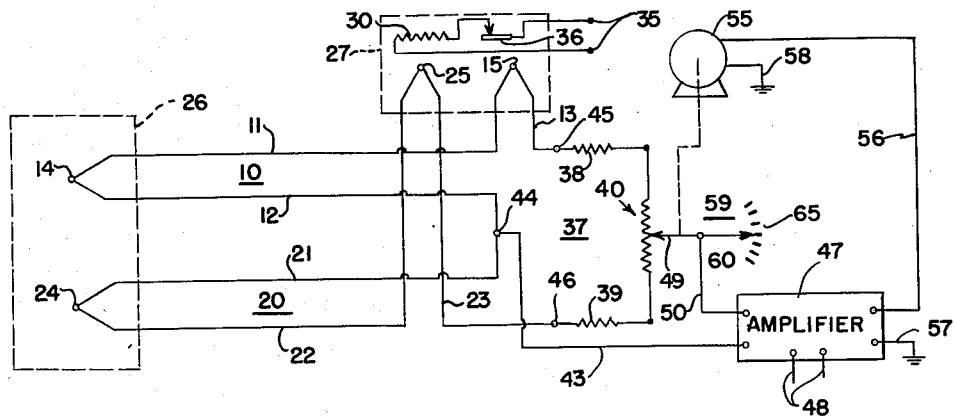
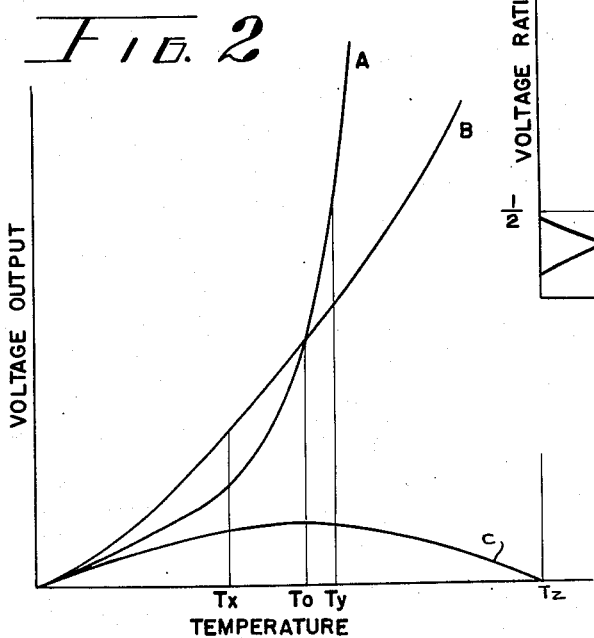
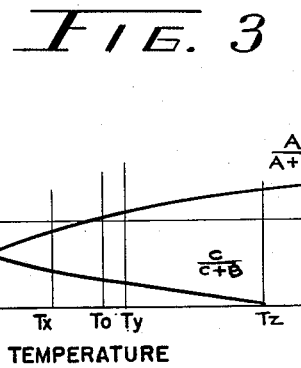
INVENTOR.
ORVILLE J. UNDERWOOD
BY George H. Fisher
ATTORNEY

United States Patent Office 2,696,120
Patented Dec. 7, 1954

2,696,120

TEMPERATURE INDICATING APPARATUS

Orville J. Underwood, Minneapolis, Minn., assignor to Minneapolis-Honeywell Regulator Company, Minneapolis, Minn., a corporation of Delaware Application January 2, 1951, Serial No. 203,973

8 Claims. (Cl. 73—360)

The present invention is concerned with a new and an improved thermoelectric temperature indicating or measuring circuit which is particularly adapted for use without a standardization voltage source.

In the thermoelectric thermometry field considerable progress has been accomplished since the discovery of Seebeck that an electric current would be generated in a closed circuit comprising two dissimilar metals when the junctions of the metals are maintained at different temperatures.

Today, the thermocouple, the name that has been given to two dissimilar metals joined together for the purpose of obtaining a voltage output, is quite common in nearly every field of industry. The conventional thermocouple temperature measuring potentiometer circuit comprises a slide wire rheostat, a galvanometer, a service cell which furnishes the potential that is necessary to operate the potentiometer circuit, a thermocouple, and a standard cell. Since the accuracy of such a thermocouple temperature measuring potentiometer circuit depends primarily on the constancy of the output voltage of the service cell or any voltage supply that might be used in the particular case, the voltage sources that are made available by the use of rectifiers connected to an alternating current generating supply are not stable enough for use in such a circuit. Therefore, if a service cell, or dry cell in a particular case, is used it is necessary that a standardization voltage supply be available to standardize the potentiometer network at frequent intervals during its use. The standard voltage cell which is available on the commercial market must be constructed to withstand various conditions that such a thermocouple temperature measuring potentiometer circuit might have to withstand. However, the existence of changing ambient temperatures and the variations in altitude have presented problems which have made the construction of such a standard cell almost impractical and very expensive.

In a copending patent application, Serial No. 198,263, filed November 30, 1950, by Eduard C. Petry, an improved temperature measuring thermocouple potentiometer circuit has been disclosed in which a standardization voltage is not required. The thermocouple temperature measuring potentiometer circuit in the copending application comprises two thermocouples having dissimilar voltage output characteristics whose output voltages are connected to a common potentiometer circuit in opposition so that the ratio of the voltage output of the two thermocouples provides an indication of the temperature of the hot junctions of each of the thermocouples. One of the temperature limits of the temperature range of this thermocouple circuit is limited at that temperature at which the voltage output characteristic curves of the two thermocouples intersect. In other words, when the ratio of the output voltages of each of the thermocouples is unity.

In the present invention an improved thermocouple temperature measuring potentiometer circuit has been devised so that the temperature range of the potentiometer circuit is not limited at that temperature at which the voltage ratio of the output voltages of the two thermocouples is unity, thus providing a wider operating range.

It is an object of the present invention to provide a new and an improved temperature indicating device that does not require a standard voltage cell for the calibration of the potentiometer circuit.

Another object of the present invention is to provide a temperature indicating apparatus in which the output voltage of the one thermocouple is connected in series with the output voltage of a second dissimilar thermocouple and the total output voltage is applied between the terminals of a potentiometer circuit so that the voltage of one of the thermocouples only can be connected for comparison with a portion of the voltage across the potentiometer in such a manner that the ratio of the output voltage of one thermocouple to the total output voltage provides an indication of the temperature of the hot junctions of the two thermocouples.

Still another object of the present invention is to provide a temperature indicating apparatus in which the output voltages of a first thermocouple and a second thermocouple are connected additively in series and applied to a potentiometer circuit and the output voltage of one of the thermocouples is connected to a variable tap on the potentiometer circuit for comparison with a portion of voltage across the potentiometer so that the ratio of the output voltage of the one thermocouple to the total output voltage provides an indication of the temperature of the hot junctions of the two thermocouples.

These and other objects of the invention will become apparent after reading the attached specification in connection with the associated drawings wherein:

Fig. 1 is a circuit diagram of one embodiment of the invention;

Fig. 2 is a graphical representation of the output voltages as a function of the temperature of the hot junction, with the cold junction temperature remaining constant, of three theoretical thermocouples A, B, and C; and Fig. 3 is a graphical representation of the ratio of the output voltage of one of the thermocouples of Figure 2 to the sum of the output voltages of said one thermocouple and a second thermocouple of Figure 2, plotted as a function of the temperature differential between the temperature sensing and reference junctions, with the reference junction temperature remaining constant.

Figures 2 and 3 are plotted only for a positive differential between the reference and sensing junctions, that is, with the temperature sensing junction at a higher temperature than the reference junction.

In the basic arrangement of a thermoelectric circuit which is composed of a closed loop of two elements E and F and the current flows from the E element to the F element at the cold junction of the thermocouple, the element E is generally referred to as thermoelectrically positive with respect to the F element.

In such a closed thermocouple loop of the two elements E and F having a hot junction and a cold junction, it is possible to separate the elements at the cold junction and connect each of the elements to one of two conductors, preferably copper, of a potentiometer circuit. In such a circuit the junctions between the copper conductors and the two elements E and F would be the cold junctions or reference junctions. It would not only be necessary to maintain the two junctions at the same temperature but at a constant temperature, unless a compensative means was employed, if the hot junction is to be capable of measuring temperature. Such a circuit connection is used in the conventional thermocouple temperature measuring instrument. Once the bridge circuit of the instrument is calibrated it is assumed that the bridge temperature as well as the temperature of the cold junctions will remain relatively constant. Should the ambient temperature around the cold junction change, assuming there is no compensative means, the temperature measurement would also change even though the hot junction temperature remained constant.

In such a closed thermocouple loop of two elements E and F having a hot junction and a cold junction, it is possible to break either of the elements E or F, at a desired point between the hot and cold junctions, and connect the broken segments of each of the two portions of the broken element to one each of two conductors of a potentiometer circuit. Assuming that the F element of the closed thermocouple loop of the elements E and F is broken between the two junctions and connected to two copper conductors, the thermocouple circuit would then have a hot junction of the E and F elements, a cold junction of the E and F elements, and a pair of junctions of the F element and the copper conductors. In this circuit the cold junction temperature must be maintained at a constant value, assuming that there is no compensative means employed, and the temperatures of the junction between the segments of the F element and the copper conductors must remain the same if a potentiometer connected to the conductor is to accurately indicate the temperature of the hot junction. However, it is not necessary that the common temperature of the junctions between the F element and the copper conductor remain constant. If the two junctions between the segments of the F element and the copper conductors are not maintained at the same temperature, the resultant thermoelectromotive force in the circuit will depend not only upon the thermocouple element materials and the temperature of the measuring junction, either the hot or the cold junctions, as the case may be, but also upon the temperatures of these added junctions and the thermoelectric characteristic of copper with respect to the element F.

In Fig. 1, a thermoelectric thermometry potentiometer circuit is shown comprising a first thermocouple 10 comprising two dissimilar metallic elements 11 and 12, and an element 13 which is identical to the element 12 forming the thermocouple junctions 14 and 15 which are commonly known as the "hot" or temperature sensing junctions and the "cold" or reference junctions, respectively. A second thermocouple circuit 20 also comprising two dissimilar metallic elements 21 and 22, and an element 23 which is identical to the element 21, forming the thermocouple junctions 24 and 25, which are also commonly known as the "hot" and "cold" junctions, respectively. The two hot junctions 14 and 24 of the thermocouple circuit are contained in a chamber 26 which might be an oven, an engine or any other type of apparatus in which the temperature is to be controlled or measured. The cold junctions 15 and 25 are contained in a second chamber 27 in which the ambient temperature is maintained at a constant predetermined value by a controlled heat source 30. The heat source 30 is connected in series with a bimetal switching element 36 to a power source by the input terminals 35.

A potentiometer circuit 37, comprising a series connection of two ballast resistors 38 and 39 and a potentiometer winding 40, is connected to the terminals 45 and 46. The element 13 of the thermocouple 10 is connected to the terminal 45 and the element 23 of the thermocouple 20 is connected to the terminal 46 so that when the elements 21 and 12 of the thermocouples 20 and 10 respectively are connected together, the output voltages of the two thermocouples 10 and 20 are applied to the potentiometer circuit 37. These previously mentioned connections should be made so that the two thermocouples 10 and 20 are connected in a manner so that their respective output voltages are additive. A terminal 44, which is a junction of the thermocouple elements 12 and 21, also provides a connection terminal for a conductor 43.

An amplifier 47, which is a conventional type voltage amplifier having an input circuit and an output circuit, is connected to a source of power by the conductors 43. The conductor 43 is connected to one of the terminals of the input circuit of the amplifier 47. A variable tap 49 which is associated with the potentiometer winding 40 is connected to the input circuit of the amplifier 47 by a conductor 50.

A motor 55 is connected to the output circuit of the amplifier 47 by a conductor 56. The output circuit of the amplifier as well as the input circuit of the motor each has a second terminal that is grounded by the conductors 57 and 58, respectively. The motor 55 is mechanically coupled to the variable tap 49 so that the position of the tap can be changed in response to a signal that is applied to the input circuit of the amplifier. An indicating device 59 having a pointer 60 and a scale 65 is mechanically coupled to the tap 49 so that the movement of the tap 49 by the motor 55 changes the position of the pointer 60 on the scale 65.

Referring to Fig. 2, graphical representations of the output voltages as a function of the temperature of the hot junction of three theoretical thermocouples A, B, and C are shown. The invention shown in Figure 1 depends on the nonlinear voltage versus temperature characteristics of at least one thermocouple. Such output characteristics as shown in Fig. 2 can be obtained from thermocouples that have elements that are made of different alloys or metal. It is well known that the output voltage of a thermocouple can be expressed as follows:

$$V = at + bt^2 + ct^3 \ldots \quad (1)$$

Where $a$, $b$, and $c$ are constants of the particular thermocouple being considered and $t$ is the temperature differential between the temperature sensing and reference junction of the thermocouple, $t$ being positive when the differential is positive, which is the case when the temperature sensing junction is at a higher temperature than the reference junction. For a great majority of thermocouples the constant $c$ is so very small that for all practical purpose the cubic term and all higher power terms of Equation 1 can be disregarded. The equation can now be put in the form of;

$$\frac{1}{b}V = \left(t + \frac{a}{2b}\right)^2 - \frac{a^2}{4b^2} \quad (2)$$

which can be seen to be of the form $X^2 = 2pYK$, which is the equation of a parabola. Therefore the curves A, B, and C of Figure 2 are parabolic curves, and Figure 2 is a showing of the curves in only the first quadrant of the voltage temperature coordinate system. The explanation of the operation of the apparatus of Figure 1 will be with respect to only the first quadrant, however, the operation of the apparatus is not to be considered as restricted to the case where these curves lie in the first quadrant. Examples of these output voltage characteristics can be obtained from The International Critical Tables of Numerical Data, Physics, Chemistry, and Technology that have been published for the National Research Council of the United States of America. Output curves, showing the thermo E. M. F. in microvolts as a function of temperatures in degrees centigrade for the combinations of elements made of various alloys and metals, are available.

Figure 3 shows graphical representations of the ratios of the output voltages of a first thermocouple to the sum of the output voltage of said first and a second thermocouple, for groups of two of the theoretical thermocouples shown in Figure 2. By way of explanation, consider the above Equation 1 neglecting the cubic term. The above described ratio for thermocouples A and B can be expressed as $$\frac{V_A}{V_A + V_B} = \frac{a_1 t + b_1 t^2}{a_1 t + b_1 t^2 + a_2 t + b_2 t^2} = R \quad (3)$$

The form of this equation can be changed to $$\left(R - \frac{b_1}{b_1 + b_2}\right)\left(t + \frac{a_1 + a_2}{b_1 + b_2}\right) = \frac{a_1 b_2 - a_2 b_1}{(b_1 + b_2)^2} \quad (4)$$

This equation is recognizable as the equation of a hyperbola of the form $(X-a)(Y-b) = C$. In this equation $a$ and $b$ are the asymptotic intercepts of the hyperbola. Therefore, the curves of Figure 4 are hyperbolic curves having asymptotic intercepts $$\frac{b_1}{b_1 + b_2}$$

and $$\frac{a_1 + a_2}{b_1 + b_2}$$

which intercepts can be seen to be a function of the particular thermocouples being considered.

*Operation*

Let us assume the thermocouples 10 and 20 of the circuit shown in Fig. 1 have voltage output versus hot junction temperature characteristics similar to the characteristic curves B and C, respectively as shown in Fig. 3. The total voltage or the sum of the voltage outputs of the two thermocouples would be applied between the terminals 45 and 46 of the potentiometer circuit 37. At the temperature $T_x$ the ballast resistors 38 and 39 could be adjusted so that the variable tap 49 was positioned at the upper extreme of the potentiometer winding 40 and also the ballast resistors could be adjusted so that the variable tap would be positioned at the lower extreme of the potentiometer winding 40 at a temperature $T_y$.

When the variable tap 49 is positioned on the potentiometer winding 40 at a position so that the input signal to the amplifier 47 is zero, the tap is said to be in a "null" position. It will be remembered that the output voltages of thermocouples 10 and 20 are connected to be additive across terminals 45 and 46. Therefore, the input signal to the amplifier can be expressed as:

$$\text{amplifier voltage} = V_{20} - k(V_{10} + V_{20}) \quad (5)$$

where $k$ is a term indicative of the position of variable tap 49 and can be expressed as;

$$k = \frac{R_1}{R_2} \quad (6)$$

where $R_1$ is the resistance of the potentiometer circuit from terminal 46 to terminal 45 and $R_2$ is the resistance of the potentiometer circuit from terminal 46 to variable tap 49. As before stated, the variable tap 49 is positioned so that the amplifier voltage is reduced to zero. Equation 5 can now be expressed as:

$$k = \frac{V_{20}}{V_{10} + V_{20}} \quad (7)$$

Therefore the position of the variable tap 49 as expressed in Equation 6 is in fact also the ratio of the voltage outputs of thermocouples 10 and 20 as expressed by Equation 7.

Figure 3 is a plot of the ratio, expressed by Equation 7, as a function of the temperature differential between the thermocouple junction. Since this ratio is also indicative of the position of variable tap 49, as shown in Equation 6, it can be readily seen that the position of tap 49 is an indication of the temperature of oven 26. This is true since Figure 3, by the use of Equations 6 and 7, can easily be considered to be a plot of the position of tap 49 plotted as a function of the temperature differential between the thermocouple junctions. Assume that the temperature of the chamber 26 is at a temperature of $T_x$ and that chamber 27 is maintained at a constant ambient temperature. The voltage that would be available across the potentiometer winding 40 would be a portion of the total voltage of the two thermocouples 10 and 20 since part of the voltage drop would be across the ballast resistors 38 and 39. At a temperature greater than $T_x$ the variable tap 49 will move downwardly on the potentiometer winding so that the voltage between the terminal 46 and the variable tap 49 will be equal to the voltage output of the thermocouple 20 which is represented by curve C in Fig. 2. This also follows from Figure 3 which shows that at a greater temperature than $T_x$ the ratio expressed by Equation 6 will decrease. This is affected by tap 49 moving downward. The variable tap will be repositioned whenever there is a difference between the voltage of the thermocouple 20 and the voltage between the variable tap 49 and terminal 46. This difference would be applied to the input circuit of the amplifier 47 which would cause the motor 55 to operate and to move the variable tap to a point on the potentiometer winding 40 where the input signal to the amplifier was reduced to the zero or "null" position. As the temperature increases to $T_y$, the variable tap 49 will move downwardly on the potentiometer winding constantly seeking the "null" point at which the voltage between the terminal 45 and the variable tap 49 is equal to the voltage output of thermocouple 20. As the motor 55 positions the variable tap, the pointer 60 of the indicating device 59 moves on the scale 65. The scale 65 can be calibrated to the temperature range selected (which, in this case, is between $T_x$ and $T_y$) so that the pointer 60 will indicate the temperature of the chamber 26 and the hot junctions 14 and 24. If the temperature of the chamber 26 drops, that is, approaches $T_x$, the voltage of the thermocouple 20 will be larger than the voltage between the variable tap 49 and the terminal 45 and the difference will be applied to the input circuit of the amplifier 47. However, in this case the difference would be of the opposite polarity and the amplifier would render the motor operative in the opposite direction to move the variable tap 49 upwardly on the potentiometer winding 40 to the newly established "null" point depending on the temperature of the chamber 26.

While the limits of the temperature were set at $T_x$ and $T_y$ for the thermocouple characteristics B and C, the range could be extended to the temperature $T_z$. At the temperatures above $T_z$ the output voltage of thermocouple C is negative with respect to thermocouple B and Equation 5 can only be satisfied by $k$ becoming a negative value. However, $k$ as expressed by Equation 6 is a ratio of resistances and cannot be negative. Therefore a limit in range has been reached. Let us assume that the thermocouples 10 and 20 have output voltage characteristics similar to the curves B and R, respectively, of Figure 2. The ratio of the output voltage of thermocouple A to the sum of the output voltages of thermocouple A and the thermocouple B steadily increases as the temperature of the oven 26 increases. As shown in Figure 3, the ratio is 1/2 at the temperature $T_0$ and although the ratio continues to rise it approaches the asymptotic intercept of the hyperbola and never crosses the ratio value of 1. Therefore, the useful range of the apparatus using thermocouples A and B extends the entire range of the temperature scale shown in Figures 2 and 3 and theoretically to an infinite temperature.

It must be noted that the temperature ranges set forth above when using the thermocouples A, B, and C are functions of the particular combination of thermocouples selected, and while the ranges will vary with different thermocouples, the above explanation can be applied to obtain the working limits of the invention for any combination of thermocouples selected.

Therefore, this improved temperature measuring thermocouple potentiometer circuit has a range that is only limited by the temperature at which the ratio of the output voltages of the two thermocouples expressed by Equation 7 does not change sign. When the output voltage versus temperature characteristics of the two thermocouples that are selected for use in the temperature measuring potentiometer circuit intersect, the temperature $T_0$ at this intersection does not determine one of the limits of the temperature range in which the potentiometer circuit can be used with said thermocouples.

In the circuit that is shown in Figure 1, the terminals 44, 45, and 46 are connections between the elements of the thermocouples and the leads of the potentiometer circuit which are commonly made of copper. For the proper operation of the thermocouple circuit it is necessary that these terminals 44, 45, and 46 be maintained at the same temperature so that any thermoelectric voltage that is generated by the junctions of the particular elements with copper are balanced around the circuit. It is possible that if the cold junctions 15 and 25 were eliminated and the element 11 and the element 22 were connected directly to the terminals 45 and 46, respectively, it would be necessary that the terminals 44, 45, and 46 be maintained at not only the same temperature but at a constant temperature, if no compensative means is used.

The selection of materials that are to be used in the elements of the thermocouples for the circuit shown in Fig. 1 must be considered for the temperature range in which the circuit is to be used.

Having thus described my invention, I claim:

1. Temperature indicating apparatus comprising, electronic controlling means having an input, motor means controlled by said controlling means in accordance with the signal applied to said input, potentiometer means having end terminals and a variable tap that is operated by said motor means when said controlling means receives an input signal, a first thermoelectric voltage generator comprising positive and negative output leads of a first and a second metal, circuit means connecting said positive lead to one of said end terminals of said potentiometer means, a second thermoelectric voltage generator comprising positive and negative output leads of a third and a fourth metal, said first and second generators being subjected to a common temperature to be indicated and having different temperature versus voltage characteristics, circuit means connecting the negative lead of said second generator to the other of said end terminals of said potentiometer means, means connecting the negative output lead of said first thermoelectric voltage generator to the positive output lead of said second thermoelectric voltage generator to form a terminal, circuit means connecting said last named terminal to the input of said electronic controlling means, circuit means connecting said tap to the input of said electronic controlling means to thereby apply to said electronic controlling means an input signal which is a function of the relative output voltages of said first and second generators and the position of said variable tap, said controlling means and said motor means being arranged to cause said variable tap to be positioned by said motor means to reduce said input signal substantially to zero whenever said input signal is different from zero, and indicating means including said variable tap for indicating the common temperature of said thermoelectric voltage generators.

2. A temperature indicating device comprising a first thermocouple of a first and a second metal joined to form a hot junction and a cold junction, said thermocouple having a positive and a negative output terminal, a second thermocouple of a third and a fourth metal joined to form a hot junction and a cold junction, said second thermocouple having a positive and a negative output terminal, said first and second thermocouples having different temperature versus voltage characteristics, said hot junctions being exposed to a common temperature to be indicated, a potentiometer circuit comprising two ballast resistors and a potentiometer connected in series between two end terminals, said potentiometer having a tap, electronic controlling means having an input and an output circuit, motor means connected for driving said tap, said motor means being connected to the output circuit of said electronic controlling means, circuit means connecting the positive output terminal of said first thermocouple to one of said end terminals, circuit means connecting the negative output terminal of said second thermocouple to the other of said end terminals, indicator means having a scale and a pointer, said pointer being mechanically coupled to said tap; circuit means connecting said tap to the input circuit of said electronic controlling means, and circuit means connecting the negative output terminal of said first thermocouple and the positive output terminal of said second thermocouple to the input circuit of said electronic controlling means to thereby apply to said input circuit a control voltage which is a function of the relative output voltages of said thermocouples and the position of said tap, said electronic controlling means and said motor means being arranged to cause said tap to be positioned to reduce said control voltage substantially to zero whenever said control voltage is different from zero, the position of said tap being indicative of the temperature to be indicated.

3. Temperature indicating apparatus comprising: a first and a second source of signal voltage, said sources being subjected to a common temperature to be indicated and having temperature versus output voltage characteristics which differ; a potentiometer having end terminals and a movable tap; voltage responsive means having an input circuit, power means controlled by said voltage responsive means and mechanically connected to position said movable tap in accordance with the input signal of said voltage responsive means; circuit means connecting said first and second sources in series adding relation to form a connection between said sources, means connecting said series connected first and second sources to said end terminals of said potentiometer to thereby apply across said potentiometer a voltage which is the sum of the output voltage of said first and second sources; and means connecting said input circuit between said voltage responsive means to said tap and the connection of said first and second sources, said input circuit thereby having applied thereto a signal voltage which is a function of the position of said movable tap and the relative outputs of said sources, said voltage responsive means and said power means being arranged to reposition said movable tap to substantially reduce said signal voltage to zero whenever said signal voltage is different from zero, the position of said tap being indicative of the temperature to be indicated.

4. Temperature indicating apparatus comprising; a first thermocouple of a first and a second metal having a first and a second output terminal of a first and a second polarity respectively, a second thermocouple of a third and a fourth metal having a first and a second output terminal of said first and second polarity respectively, said first and second thermocouples being subjected to a common temperature to be indicated and having output voltage versus temperature characteristics which differ; a potentiometer having end terminals and a tap; voltage responsive means having two input circuit terminals; circuit means connecting said first output terminal of said first thermocouple to one of the end terminals of said potentiometer, circuit means connecting said second output terminal of said second thermocouple to the other of the end terminals of said potentiometer, circuit means connecting one of said input circuit terminals of said voltage responsive means to the tap of said potentiometer, and circuit means connecting the other of said input circuit terminals of said voltage responsive means to the second output terminal of said first thermocouple and to the first output terminal of said second thermocouple, said input circuit thereby having impressed thereon a signal voltage indicative of the temperature to be indicated.

5. Temperature indicating apparatus comprising; a first thermocouple of a first and a second metal having a first output terminal of a first polarity and a second output terminal of the opposite polarity, a second thermocouple of a third and a fourth metal and having a first output terminal of said first polarity and a second output terminal of said opposite polarity, said first and second thermocouples being subjected to a common temperature to be indicated and having output voltage versus temperature characteristics which differ; a potentiometer having end terminals and a movable tap; voltage responsive means having input terminals and power means mechanically connected to said tap to position said tap in accordance with the signal voltage applied to said input terminals; circuit means connecting said first output terminal of said first thermocouple to one of said end terminals of said potentiometer, circuit means connecting said second output terminal of said second thermocouple to the other of said end terminals of said potentiometer, circuit means connecting one of the input terminals of said voltage responsive means to said tap, circuit means connecting another of said input terminals to the second output terminal of said first thermocouple and to the first output terminal of said second thermocouple to thereby apply to the input terminals of said voltage responsive means a signal voltage which is a function of the position of said tap and the output voltages of said first and second thermocouples, said voltage responsive means and said power means being arranged to reposition said tap to substantially reduce said signal voltage to zero whenever said signal voltage is different from zero, the position of said tap when said signal voltage is substantially zero being indicative of the temperature to be indicated.

6. A temperature indicating device comprising a first source of signal voltage which varies in accordance with temperature comprising a first active element of a first metal and a second active element of a second metal, said first source having a positive and a negative output terminal, a second source of signal voltage which varies in accordance with temperature comprising a first active element of a third metal and a second active element of a fourth metal, said second source having a positive and a negative output terminal, said first and second sources being exposed to a common temperature to be indicated and having temperature versus voltage characteristics which differ, a potentiometer circuit comprising two end terminals and a tap, circuit means connecting the positive output terminal of said first source to one of said end terminals, circuit means connecting the negative output terminal of said second source to the other of said end terminals, controlling means having two input terminals, motor means controlled by said controlling means in accordance with the voltage applied to said input terminals, circuit means connecting the negative output terminal of said first source and the positive output terminal of said second source to one of the input terminals of said controlling means, circuit means connecting said tap to the other of said input terminals of said controlling means, said input terminals thereby having impressed thereon a voltage which is a function of the relative outputs of said first and second sources and the position of said tap, said controlling means and said motor means being arranged to position said tap to reduce said voltage substantially to zero whenever said voltage is different from zero, and movable means mechanically coupled to said tap and driven by said motor means so that the position of said tap on said potentiometer positions said movable means at a predetermined position for said temperature.

7. Variable condition indicating apparatus comprising, a first and a second source of signal voltage, said sources being subjected to a common variable condition to be indicated, the output voltage of said first and second sources being dependent upon the magnitude of the common variable condition, said first and second sources having output voltage versus variable condition characteristics which differ, a potentiometer having end terminals and a movable tap; voltage responsive means having an input circuit, power means controlled by said voltage responsive means and mechanically connected to position said movable tap in accordance with the input signal of said voltage responsive means; circuit means connecting said first and second sources in series adding relation to form a connection between said sources, means connecting said series connected first and second sources to said end terminals of said potentiometer to thereby apply across said potentiometer a voltage which is the sum of the output voltage of said first and second sources; and means connecting the input circuit of said voltage responsive means to said tap and said connection between said first and second sources, said input circuit thereby having applied thereto a signal voltage which is a function of the position of said movable tap and the relative output of said sources, said voltage responsive means and said power means being arranged to reposition said movable tap to substantially reduce said signal voltage to zero whenever said signal voltage is different from zero, the position of said tap being indicative of the variable condition to be indicated.

8. Variable condition indicating apparatus comprising; a first thermocouple of a first and a second metal having a first and a second output terminal of the first and a second polarity respectively, a second thermocouple of a third and a fourth metal having a first and a second output terminal of said first and second polarity respectively, said first and second thermocouples being subjected to a common variable condition to be indicated, the output voltage of said first and second thermocouples being dependent upon the magnitude of said variable condition, said first and second thermocouples having output voltage versus variable condition characteristics which differ; a potentiometer having end terminals and a tap; voltage responsive means having two input circuit terminals; circuit means connecting said first output terminal of said first thermocouple to one of the end terminals of said potentiometer, circuit means connecting said second output terminal of said second thermocouple to the other of the end terminals of said potentiometer, circuit means connecting one of said input circuit terminals of said voltage responsive means to the tap of said potentiometer, and circuit means connecting the other of said input circuit terminals of said voltage responsive means to the second output terminal of said first thermocouple and to the first output terminal of said second thermocouple, said input circuit thereby having impressed thereon a signal voltage indicative of the variable condition to be indicated.

References Cited in the file of this patent

UNITED STATES PATENTS

| Number | Name | Date |
|---|---|---|
| 540,008 | Whipple et al. | May 28, 1895 |
| 2,300,742 | Harrison et al. | Nov. 3, 1942 |
| 2,404,064 | Heigl et al. | July 16, 1946 |

FOREIGN PATENTS

| Number | Country | Date |
|---|---|---|
| 184,455 | Germany | May 11, 1907 |
| 272,448 | Germany | Mar. 31, 1914 |